United States Patent [19]

Takahashi

[11] Patent Number: 4,609,013

[45] Date of Patent: Sep. 2, 1986

[54] PRESSURE MODULATOR VALVE DEVICE

[75] Inventor: Shigeo Takahashi, Anjo, Japan

[73] Assignees: Aisin Seiki Kabushiki Kaisha, Kariya; Toyota Jidosha Kabushiki Kaisha, Toyota, both of Japan

[21] Appl. No.: 708,948

[22] Filed: Mar. 6, 1985

[30] Foreign Application Priority Data

Mar. 30, 1984 [JP] Japan ................. 59-061003

[51] Int. Cl.$^4$ ............... B60K 17/00; B60K 41/00
[52] U.S. Cl. .................... 137/637; 74/865; 74/867; 251/251
[58] Field of Search .......... 137/637, 637.1; 74/865, 74/867; 251/251

[56] References Cited

U.S. PATENT DOCUMENTS

| | | | |
|---|---|---|---|
| 2,244,213 | 6/1941 | Patton | 137/637 |
| 2,247,732 | 7/1941 | Paton | 160/39 |
| 2,400,964 | 5/1946 | Vincent et al. | 184/6.12 |
| 2,498,828 | 2/1950 | Sheppard | 74/801 |
| 2,903,910 | 9/1959 | Carnegie | 74/645 |
| 3,053,115 | 9/1962 | Cartwright et al. | 74/730 |
| 3,146,629 | 9/1964 | Schmitter | 74/410 |
| 3,319,491 | 5/1967 | Simpson | 74/740 |
| 3,396,610 | 8/1968 | Rich, Jr. et al. | 74/740 |
| 3,407,686 | 10/1968 | Tuck et al. | 74/701 |
| 3,485,315 | 12/1969 | Bergren | 137/637.1 |
| 3,539,035 | 11/1970 | Wolkenstein | 74/467 |
| 3,543,611 | 12/1970 | Uozumi et al. | 74/867 |
| 3,583,526 | 6/1971 | Mulleder et al. | 74/467 |
| 3,834,248 | 9/1974 | Caliri | 74/467 |
| 3,939,733 | 2/1976 | Wetrich | 74/740 |
| 4,091,690 | 5/1978 | Miyao | 74/867 |
| 4,222,289 | 9/1980 | Watanabe et al. | 74/740 |
| 4,418,777 | 12/1983 | Stockton | 74/467 |
| 4,459,869 | 7/1984 | Bucksch | 74/467 |
| 4,476,746 | 10/1984 | Miki et al. | 74/867 |
| 4,480,492 | 11/1984 | Fujioka et al. | 74/467 |
| 4,534,243 | 8/1985 | Yokoyama et al. | 74/867 |

FOREIGN PATENT DOCUMENTS 1212929 11/1970 United Kingdom.
2115505 5/1982 United Kingdom.

Primary Examiner—G. L. Walton
Attorney, Agent, or Firm—Oblon, Fisher, Spivak, McClelland & Maier

[57] ABSTRACT

A pressure modulator valve device having adjacent modulator valves, each including a sleeve, a plunger slidably fitted in the sleeve and a cam, the cams being connected to each other by a connecting member, a single supporting member for operatively supporting each of the cams and which is in contact with each sleeve so as to cover a front surface of each modulator valve, and a spring for biasing each sleeve in the direction of the single supporting member.

4 Claims, 8 Drawing Figures

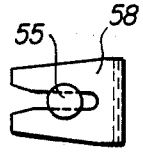
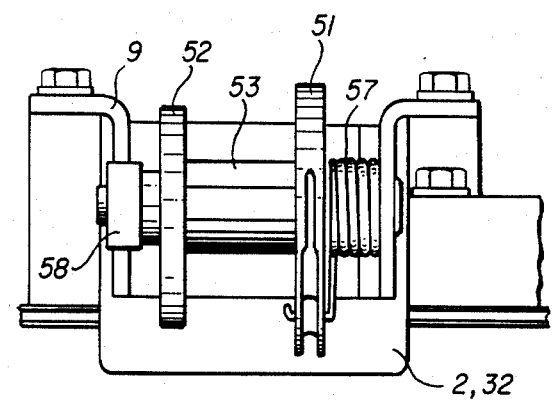
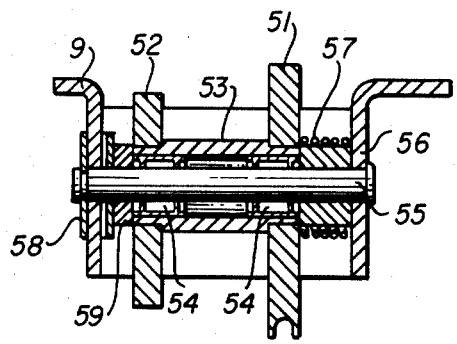

PRESSURE MODULATOR VALVE DEVICE

BACKGROUND OF THE INVENTION

1. Field of the Invention

This invention relates generally to a pressure modulator valve device and more specifically to a pressure modulator valve device for modulating a pressure to suitably different pressures each of which serve to operate different fluid pressure operated devices, for example, a servo, an actuator, a valve etc., which are disposed in an oil pressure circuit in an automatic transmission wherein the pressure modulator valve device includes a plurality of modulator valves each having a cam for changing a modulating characteristic thereof and each operated by the same input.

2. Description of the Prior Art

In general, a throttle responsive pressure corresponding to the degree of opening of a throttle valve in an internal combustion engine of motor vehicle is, for example, used for controlling a main pressure which acts on a fluid operated servo for a friction clutch or a friction brake disposed in an oil pressure circuit of an automatic transmission. The throttle responsive pressure controls a shift valve that receives a governor pressure corresponding to vehicle speed, said shift valve transmitting the main pressure to a selected fluid operated servo. In order to accomplish a smooth shift control in the automatic transmission, it is desirable that the throttle responsive pressure for controlling the main pressure and the throttle responsive pressure for controlling the shift valve are of a different value.

Therefore, in conventional pressure modulator valve devices, the valve comprises a plurality of modulator valves each having a cam for determining a modulating characteristic thereof wherein each cam is interlocked to a throttle valve. In this type of valve, however, each cam is independently mounted on the modulator valve. As a result, a member for supporting a cam must be provided for each modulator valve. This can create an intricate mechanism and an associated scaling-up of the modulator valve.

SUMMARY OF THE INVENTION

It is an object of the present invention to avoid the aforementioned and other disadvantages of a conventional pressure modulator valve device.

More particularly, an object of the present invention is to provide an improved pressure modulator valve device which is both a simple mechanism and small in scale.

Another object of the present invention is to provide a pressure modulator valve device which can allow for easy positioning of a sleeve for guiding a plunger contacted with a cam.

These and other objects are accomplished by the pressure modulator valve device of the present invention which includes a plurality of modulator valves located side-by-side, each including a plunger slidably fitted within a sleeve, a cam disposed in each modulator valve, the respective cams being connected to each other by a connecting member, a single supporting member for operatively supporting each cam and which is in contact with the sleeve of each modulator valve so as to cover a front surface of each modulator valve, and a spring biasing the sleeve toward the single supporting member.

Consequently, in the present invention, it is not necessary to provide a member for supporting a cam that is separately disposed in each modulator valve.

Furthermore, in the present invention, the positioning of the sleeve for guiding the plunger is easily accomplished by which the sleeve is contacted with the single supporting member wherein the spring biases the sleeve in the direction of the single supporting member.

Still further, in the present invention, a plurality of random pressure modulating characteristics can be simultaneously obtained with a single input applied to each modulator valve by which a plurality of cam profiles can be set as desired.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein:

FIG. 4 shows a front view of the embodiment of FIG. 1;

FIG. 5 shows a partial left side view of FIG. 4;

FIG. 6 is a cross-sectional view taken along the line VI—VI of FIG. 3;

DETAILED DESCRIPTION OF THE PREFERRED EMBODIMENTS

Figure 1:
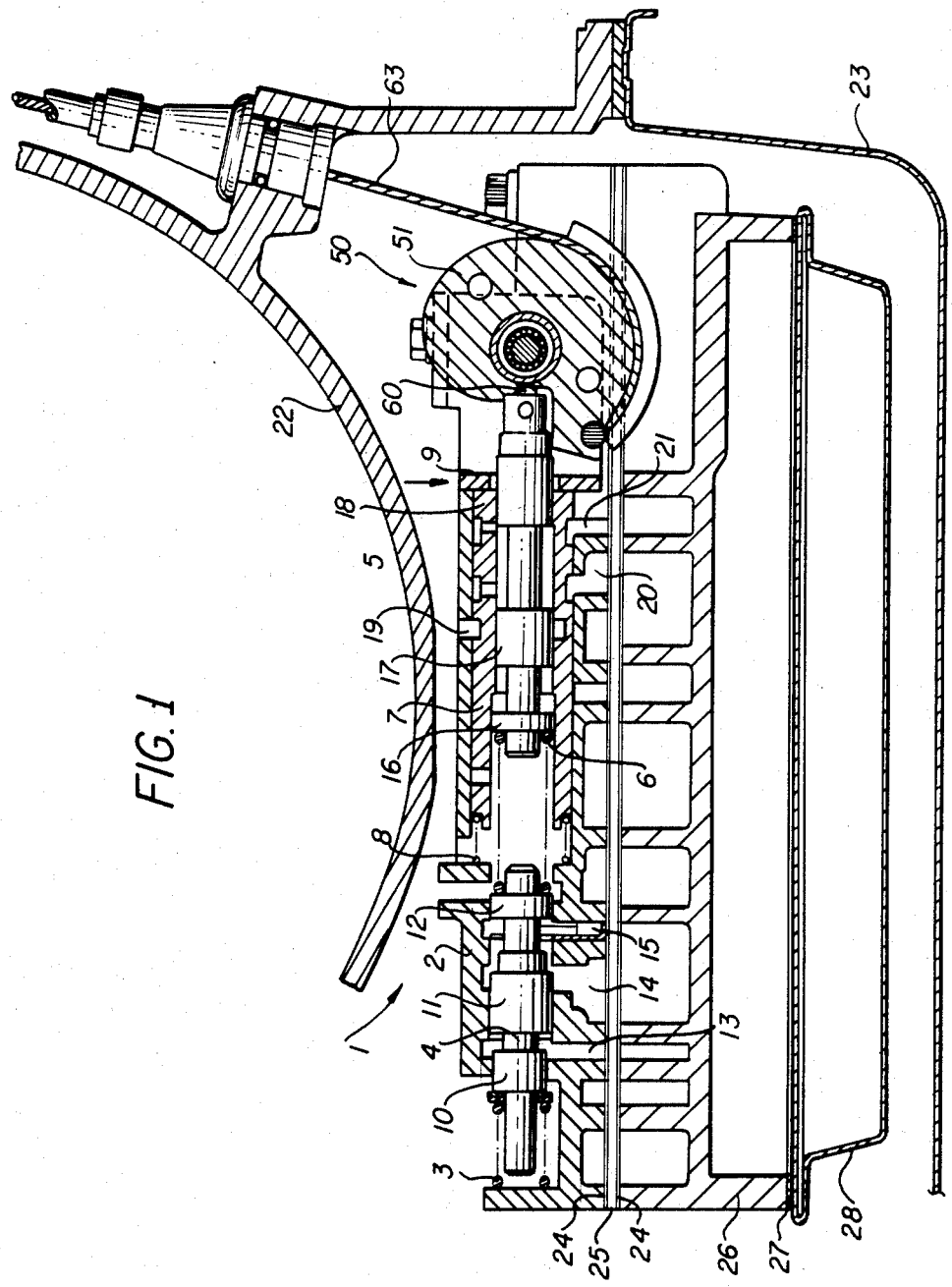
FIG. 1 is a cross-sectional view of a pressure modulator valve device, in particular a first modulator valve according to the first embodiment of the present invention.
Figure 2:
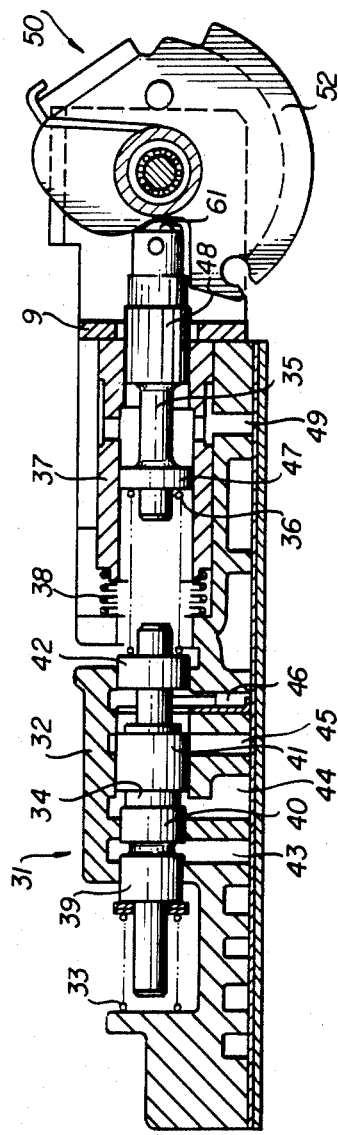
FIG. 2 is a cross-sectional view of a pressure modulator valve device, in particular a second modulator valve according to the first embodiment of the present invention.

As shown in FIGS. 1 and 2, a pressure modulator valve device for modulating pressure in response to the degree of opening of a throttle valve comprises the first modulator valve 1 for controlling main pressure operating a fluid operated servo and a second modulator valve 31 for controlling a shift valve transmitting the main pressure to the selected fluid operated servo.

As shown in FIG. 1, the first modulator valve 1 comprises an upper valve body 2, a lower valve body 26, a spool 4 slidably fitted on the body 2, a spring 3 biasing the spool 4 in a forward direction, a plunger 5 aligned with the spool 4 and a spring 6 disposed between spool 4 and plunger 5. The plunger 5 is slidably guided by a sleeve 7 fitted in the body 2. The sleeve 7 is positioned at a predetermined position by a spring 8 biasing sleeve 7 in a forward direction and a supporting member 9 in contact with a front portion of sleeve 7 so as to maintain sleeve 7 within valve body 2. Lands 10, 11, 12 are formed on the spool 4. Ports 13, 14, 15 corresponding to lands 10, 11, 12 are formed on cylindrical body 2. The diameters of lands 11, 12 are equal. The diameter of land 10 is smaller than that of lands 11, 12. Port 14 serves as an inlet for pressurized oil supplied from oil pump. Port 15 serves as an outlet communicated with a back pressure port of a regulator valve (not shown) for regulating the main pressure in response to a pressure supplied from port 15, namely the pressure determined by the degree of opening of the throttle valve. Port 13 serves as a feedback pressure port and is communicated with port 15 via an orifice (not shown). Lands 16, 17, 18 are formed on the plunger 5. Ports 19, 20, 21 corresponding to lands 16, 17, 18, respectively, are formed on the body 2 and the sleeve 7. Port 19 serves as an inlet for pressurized oil supplied from the regulator valve. Port 20 serves as an outlet and is communicated with a fluid pressure operated servo. Port 21 is a drain port communicated with the fluid pressure operated servo (not shown).

The first modulator valve 1 is disposed between a transmission case 22 and an oil pan 23. Gaskets 24, 24 and a corresponding plate 25 are clamped between bodies 2, 26. Gasket 27 is provided and a strainer 28 is clamped between said gasket 27 and positioned under body 26.

As shown in FIG. 2, the second modulator valve 31 comprises a valve body 32 unitarily formed with body 2 of the first modulator valve 1, a spool 34 slidably fitted in body 32, a spring 33 for biasing spool 34 in a forward direction, a plunger 35 aligned with spool 4 and a spring 36 disposed between spool 34 and plunger 35. Plunger 35 is slidably guided by a sleeve 37 fitted within body 32. The sleeve 37 is positioned at a predetermined position by a spring 38 biasing sleeve 37 in a forward direction and by a supporting member 9 contacting a front portion of sleeve 37.

Lands 39, 40, 41, 42 are formed on the spool 34. The diameters of lands 41, 42 are equal. The diameter of land 40 is smaller than that of lands 41, 42 and is larger than that of land 39. Ports 43, 44, 45, 46 corresponding to lands 39, 40, 41, 42 are respectively formed in valve body 32. Port 45 is an inlet for supplying pressurized oil from an oil pump (not shown). Port 46 serves as an outlet communicated with one of the back pressure ports of shift valve. Ports 43, 44 serve as back pressure ports, at least one of them being communicated with outlet port 46 via an orifice. Such may introduce a suitable signal pressure to the other port of ports 43, 44.

Lands 47, 48 are formed on the plunger 35. A port 49 communicated with port 43 is formed in body 32 and sleeve 37, this port being generally used as a drain port.

Figure 3:
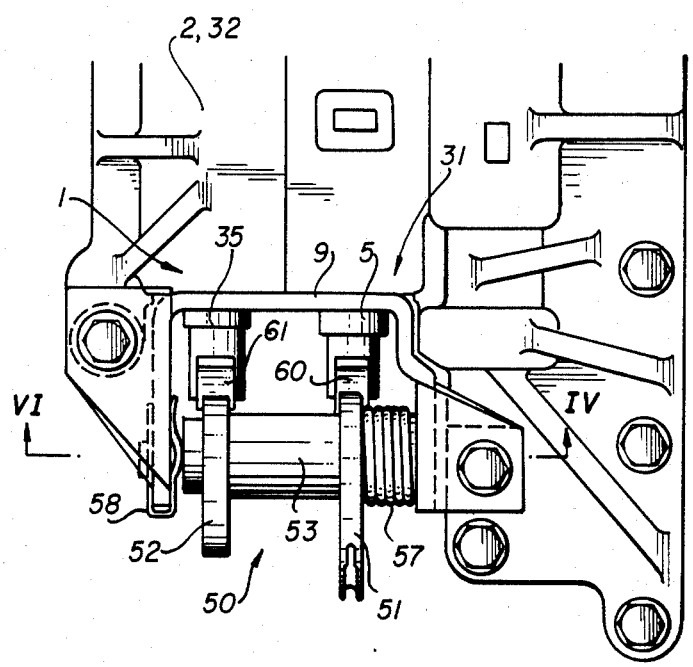
FIG. 3 shows a plan view of the embodiment of FIG. 1.

As shown in FIG. 3, modulator valves 1, 31 are arranged parallel and adjacent one another. In this embodiment, it is to be noted that the first modulator valve 1 is utilized for controlling the main pressure and the second modulator valve 31 is utilized for controlling the shift valve, but such may be used interchangeably. Furthermore, either of modulator valves 1, 31 may be used for controlling back pressure in an accumulator (not shown) of a shift controller (not shown) or for controlling signal pressure in a trimmer valve (not shown) of the shift controller (not shown).

As shown in FIGS. 3, 4 and 6, cam means 50 for depressing plungers 5, 35 comprises first cam 51 corresponding to first modulator 1, second cam 52 corresponding to second modulator valve 31, a connecting member 53 for connecting cams 51, 52 with each other and which is formed in the shape of a sleeve, a shaft 55 for rotatably mounting thereon cams 51, 52 and upon which are mounted bearings 54, 54, a spacer 56 positioned on shaft 55, a spring 57 mounted on spacer 56 for biasing cams 51, 52 to an initial position and a supporting member 9 for supporting shaft 55. The shaft 55 is fixed to the supporting member 9 by a clip 58 as shown in FIG. 5. The position of cams 51, 52 is limited by a spacer 59 and a clip 58. The first and second cams 51, 52 are of different shapes in consideration of the function of the first and second modulator valves 1, 31, respectively, and are contacted with rollers 60, 61 disposed on the top end of plungers 5, 35 respectively.

One end of spring 57 is engaged with first cam 51 and the other end thereof is engaged with supporting member 9. The drive mechanism for cams 51, 52 is a wire 63 connecting cam 51 to the accelerator pedal (not shown) of the vehicle. One end of wire 63 is fixed to the outer circumference of cam 51, and an extension thereof is guided to the accelerator pedal via a groove formed on the outer circumference of cam 51.

When the accelerator pedal is depressed the throttle valve assumes an open position and simultaneously cams 51, 52 rotate around shaft 55. By this rotation of cams 51, 52, plungers 5, 35 move in FIG. 1 in the leftward direction, respectively, via rollers 60, 61, whereby springs 6, 36 are compressed and receive a load in response to movement of plungers 5, 35, respectively. Springs 6, 36 transmit the spring force thereof to spools 4, 34, respectively. Pressurized oil supplied to modulator valves 1, 31 is thus modulated in response to the load of springs 6, 36, whereupon the throttle responsive pressure is supplied from each outlet 15, 46 of modulator valves 1, 31.

The modulating operation of modulator valves 1, 31 is as follows:

As shown in FIG. 1, when the pressure in outlet port 15 of modulator valve 1 increases, the feedback pressure in port 13 increases due to communication with outlet port 15 via an orifice (not shown), whereby the spool 4 moves in a rightward direction against the biasing force of spring 6, and communication between the inlet port 14 and outlet port 15 is cut off by land 11 of spool 4. Consequently, an increase in pressure in outlet port 15 is prevented. Next, when the pressure in outlet port 15 decreased, the pressure in feedback pressure port 13 decreases, whereby spool 4 is returned to the position shown in FIG. 1, inlet port 14 communicates with outlet port 15, and pressurized oil is supplied to outlet port 15 from inlet port 14. Consequently, a decrease in pressure in outlet port 15 is prevented. By repetition of this operation by the modulator valve 1, such serves to supply pressure corresponding to the force of spring 6 from outlet port 15. The modulating operation in second modulator valve 31 is similar to that of modulator valve 1, and therefore a detailed explanation thereof is omitted.

However, when the accelerator pedal is no longer depressed, the cams 61, 62 rotate in an opposite direction. Simultaneously, the plunger 5, 35 moves in a forward (i.e., rightward) direction, whereby the load of springs 6, 36 change in response to the degree of opening of throttle valve and modulator valves 1, 31 are operated.

Figure 7:
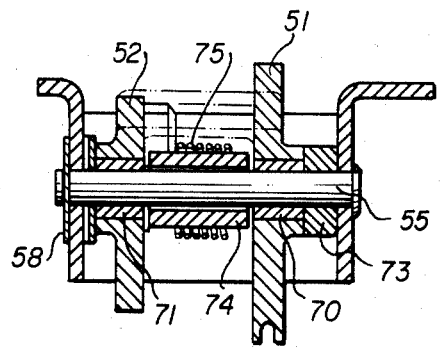
FIG. 7 is a cross-sectional view of pressure modulator valve device according to the second embodiment of the present invention.
Figure 8:
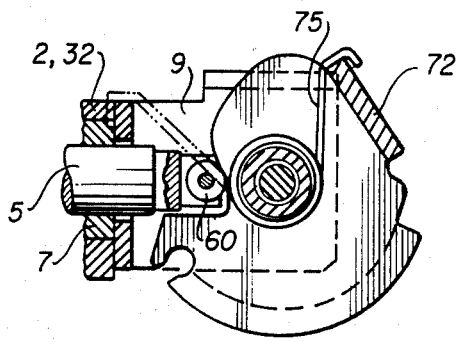
FIG. 8 shows a side view of FIG. 7.

As shown in FIG. 7 and FIG. 8, cams 51, 52 in the second embodiment of the present invention are rotatably mounted on shaft 55 via bearings 70, 71. Cams 51, 52 are connected with each other by a connecting member 72 fixed to the outer circumference of cams 51, 52 or are unitarily formed with cams 51, 52. Cams 51, 52 are limited as to the position thereof in an axial direction by a spacer 73, a collar 74 and a clip 58. A spring 75 for biasing cams 51, 52 to an initial position are arranged around collar 74, one end thereof being engaged with a connecting member 72 and the other end thereof being engaged with supporting member 9.

The operation of the second embodiment of the present invention is similar to that of the first embodiment mentioned above and therefore a detailed explanation thereof is omitted.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A pressure modulator valve device disposed in an oil pressure circuit of an automatic transmission, comprising:

first and second modulator valve means each having a valve body and a plunger slidably fitted within each valve body, said first and second modulator valve means being positioned so as to be adjacent each other;

first and second cam means for engaging each said plunger;

a connecting member for interconnecting each of said first and second cam means;

an input member connected to at least said first cam means; and a single supporting member for supporting opposite ends of said connecting member, wherein each of said first and second modulator valve means further comprises a sleeve within which said plunger is disposed and wherein said single supporting member interconnects said sleeve of each of said first and second modulator valve means so as to maintain said sleeve within each valve body, respectively.

2. A pressure modulator valve device according to claim 1, wherein said first and second modulator valve means further comprise a spring for biasing said sleeve in a direction of said single supporting member.

3. A pressure modulator valve device according to claim 1, wherein said connecting member further comprises a sleeve member.

4. A pressure modulator valve device according to claim 1, wherein said connecting member is fixed to an outer circumferential portion of each of said first and second cam means.

* * * * *